United States Patent

Kleckner

[15] 3,699,682
[45] Oct. 24, 1972

[54] TURBOFAN ENGINE THRUST REVERSER

[72] Inventor: Harold F. Kleckner, Los Angeles, Calif.

[73] Assignee: McDonnell Douglas Coporation

[22] Filed: Jan. 4, 1971

[21] Appl. No.: 103,577

[52] U.S. Cl. ..............................................60/226 A
[51] Int. Cl................................................F02k 3/02
[58] Field of Search....................60/226 A, 226, 232

[56] References Cited

UNITED STATES PATENTS

| 3,601,992 | 8/1970 | Maison | 60/226 A |
| 3,279,182 | 10/1966 | Helmintoller | 60/226 A |
| 3,344,604 | 10/1967 | Mattia et al. | 60/226 A |
| 3,024,601 | 3/1962 | Nash | 60/226 A |

*Primary Examiner*—Laurence M. Goodridge
*Assistant Examiner*—Cort Flint
*Attorney*—Walter J. Jason, Donald L. Royer and Robert O. Richardson

[57] ABSTRACT

A turbofan engine thrust reverser comprising a plurality of pivotally mounted duct members forming an integral part of the engine cowl. These members redirect the exhaust air of the fan forward and outward at such velocity and angle that the suction of the engine inlet is insufficient to cause reingestion.

7 Claims, 7 Drawing Figures

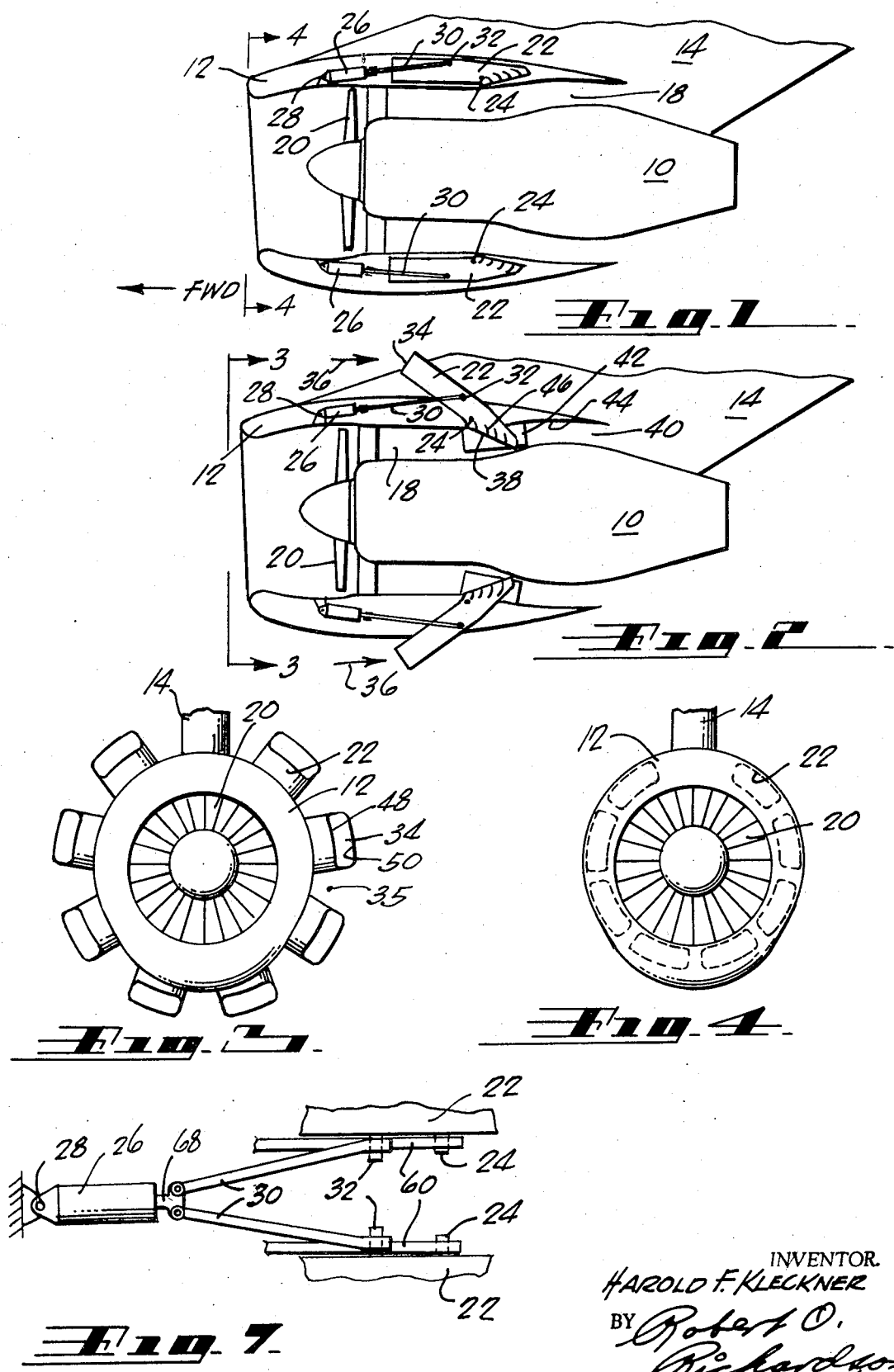

INVENTOR.
HAROLD F. KLECKNER
BY Robert O. Richardson
- ATTORNEY -

3,699,682

TURBOFAN ENGINE THRUST REVERSER

BACKGROUND OF THE INVENTION

There is a continuous need with military and commercial turbofan-powered aircraft for a turbofan reverser that will provide a greater capability than present-day reversers. This greater capability is advantageous for landing in shorter distances, landing under adverse conditions, including wet or icy landing strips, reducing brake wear and maintenance, and backing up the airplane.

Present turbofan reversers are seldom used below 60 knots because of reingestion and low effectiveness. Many future aircraft, however, will have a STOL (short takeoff and landing) capability and touch down at speeds as low as this. A need exists, therefore, for turbofan reversers that are more effective at low speed down to zero airspeed.

The constraint on the use of present-day reversers at low airspeeds is reingestion which reduces reverser effectiveness and adversely affects the engine by inducing compressor stall and high fan blade stresses because of the non-uniform flow.

Reingestion is a problem in which the reversed fan air exits at such a velocity and position that it is pulled into the engine by suction from the engine inlet. For any given reverser the amount of reingestion is dependent on airspeed and percent of engine power. Conventionally, cascades are used to exit the fan air essentially flush with the fan cowl/nacelles around most of the cowl periphery. This type of fan air exiting results in a rapid mixing of the fan and free-stream air, and as a consequence the reversed fan air flow is slowed markedly and diffused by the time it reaches the plane of the engine inlet. (See FIG. 1). Accordingly, the suction from the engine inlet can entrain much of the reversed fan air and carry it into the inlet. This reingested fan air does not contribute a reverse force, and further it reduces the velocity and momentum of the reversed fan air to provide an additional loss of fan reverser effectiveness.

SUMMARY OF THE PRESENT INVENTION

The turbofan reverser of the present invention exits the reversed fan air in a more forward position and at a higher velocity than do conventional reversers. It thus avoids or reduces the losses associated with conventional cascade type fan reversers. The fan air is scooped up by several individual reverser scoops and directed outward and forward in individual ducts or pipes. The lengths of the pipes are determined by the position at which it is desired to exit the fan air into the free stream. This position is determined by the effectiveness of the multiple-pipe high-velocity reverser and by the level of reverser effectiveness desired. The pipes should be long enough for reversed fan air to leave the reverser at a spaced distance in a direction away from the nacelle and short enough for convenience in stowing. Reverser effectiveness and reverser weight both are dependent on the length of the reverser pipe elements.

The angle of the reverser pipe relative to the engine is also important. As the pipe position is made flatter, the reverse force component is increased, but the possibility of reingestion is enhanced. The optimum position is that which gives the maximum reverse force with an acceptable level of reingestion.

BRIEF DESCRIPTION OF THE DRAWINGS

FIG. 1 is a schematic side view of a turbofan engine with the thrust reversers in the stowed position;

FIG. 2 is a schematic side view of a turbofan engine with the thrust reversers in operative position;

FIG. 3 is an elevational view taken along the line 3—3 of FIG. 2;

FIG. 4 is an elevational view taken along the line 4—4 of FIG. 1;

FIG. 7 is a plan view illustrating the reverser actuation means.

DETAILED DESCRIPTION OF THE DRAWINGS

Figure 5:
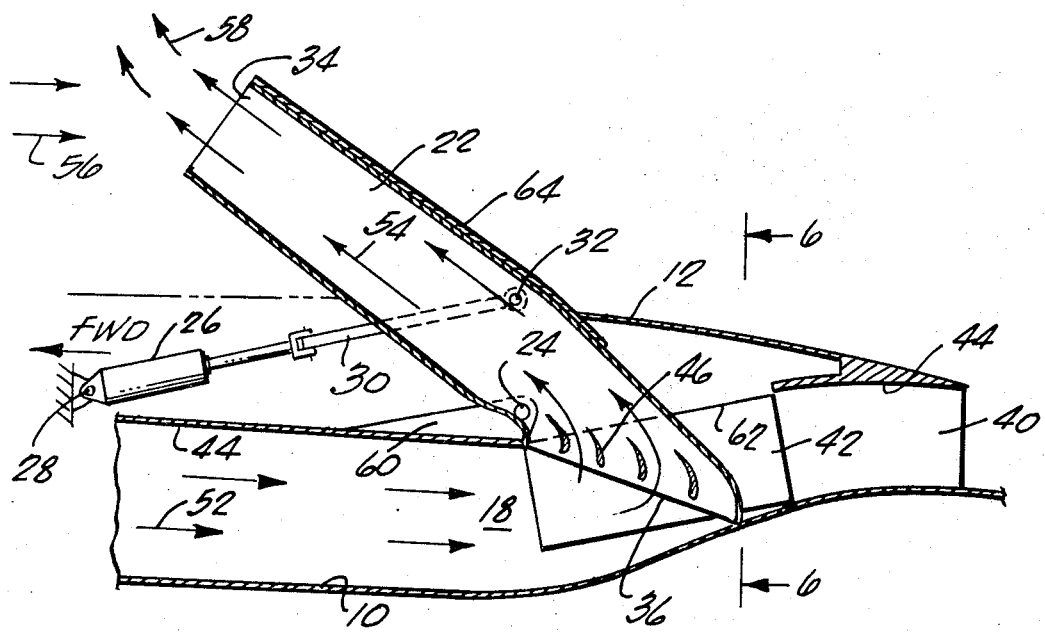
FIG. 5 is an enlarged side elevational view taken in section of the bypass air duct with the reverser operatively connected thereto.

Reference is now made to FIG. 1 wherein there is shown a turbofan engine 10 within an engine cowling 12 secured to a pylon 14. This pylon in turn is attached to an aircraft, not shown. The engine, and aircraft, moves forward in the direction of arrow 16. The engine and cowling form a bypass duct 18 through which air is projected by the fan 20 of the turbofan engine, all in a conventional manner.

To provide a simplified and lightweight reverser for the fan bypass airflow, the cowling 12 contains the reverser structure of the present invention. This consists of a plurality of duct members 22 each pivotally mounted at pivot 24 to the cowl 12 for movement between the stowed position shown in FIG. 1 and the operative position shown in FIG. 2. Actuators 26 connected to cowl 12 by brackets 28 each have extensible rods 30 pivotally attached at pivots 32 to duct members 22. These pivots 32 are spaced outwardly from pivots 24 so that longitudinal movement of rods 30 causes movement of duct members 22 between the two positions.

The operative position of reversing ducts is shown in FIG. 2. The elongation of rods 30 by actuators 26 causes the duct members 22 to pivot at 24. The outlets defined by leading edges 34 move outwardly from cowl 12 and into the airstream represented by arrows 36. The rearward portions or inner ends 38 of duct members 22 move inwardly into bypass duct 18 to prevent exit of air through the rear end 40 of duct 18. Doors 42 in the inner surface 44 are flush with the inner surface in the stowed position in FIG. 1 but pivot downwardly in the operative position shown in FIG. 2. Actuation of the doors may be done by movement of the rearward portion 38 into the bypass airflow path and frictional contact with the doors. Of course, other door actuation means may be used if desired. Turning vanes 46 in the rearward portion 38 help redirect the air from the bypass duct 18 into duct members 22.

Reference is now made to FIG. 3 which is a front view of the engine with the thrust reversers in operative position. Here there is shown the fan blades 20 within cowl 12 which is suspended from pylon 14. Spaced radially about the periphery is a plurality of duct members 22 with their outer ends 34 extending outwardly. In this view the ducts 22 resemble somewhat the spokes of a wheel in which the engine cowling 12 would be the hub. These ducts are long enough for the reversed fan air to leave the reverser separated from the cowling 12. The separation is sufficient to preclude impingement of the reversed air onto the cowling 12. The exit ends 34 of duct members 22 are non-circular in cross-section to better fit within cowling 12. They must be large enough to avoid excessive backpressure on the fan, yet small enough to give a reasonably high velocity of the air leaving the reverser duct. A total cross-sectional area of the reverser duct exit ends of about two-thirds of the area of the bypass air duct would be typical. In one instance wherein the air velocity in the bypass duct was about 450 ft. per second, the velocity at the reverser exits of between 600 and 750 ft. per second was satisfactory. Either reverser ducts are shown, but more or less than eight could be used. More ducts increases the number of mechanism; fewer ducts results in less efficient ducting. The ventilation spaces 35 between the ducts permit air to reach the engine inlet with less tendency for reingestion of the reversed air.

The elongated and somewhat curved ducts 22 are shown by dashed lines in their stowed position in cowling 12 in FIG. 4. In this position they do not detract from the streamlining of the cowling 12 in normal flight.

In FIG. 5 an enlarged sectional view of a thrust reverser duct in operative position and its relationship to the bypass air duct is shown in greater detail. Here air duct 18 is formed between the inner surface 44 of cowl 12 and the outer surface of engine 10. Air from the fan passes along the duct in the direction of arrows 52 but is redirected through end 36 of reverser duct member 22 in lieu of passing out exit 40. Doors 42 in inner surface 44 have been pivoted downwardly by end 36 of the duct member 22. Turning vanes 46 help turn the air up duct 22 in the direction of arrows 54. When the aircraft has forward velocity, the reverser air meets free-stream air 56 and is deflected outwardly as shown by arrows 58.

Duct 22 is pivotally mounted at 24 to bracket 60 on cowling 12. Spaced outwardly on duct 22 from pivot 24 is the pivotal connection 32 for extendible rod 30. When this rod 30 is extended by actuator 26 the duct 22 is moved to the position shown. When rod 30 is retracted, the duct 22 pivots to a stowed position in cowl 12 and doors 42 pivot along line 62 back into the plane of inner surface 44. The outer surface 64 of duct 22 forms part of the outside of cowling 12.

Figure 6:
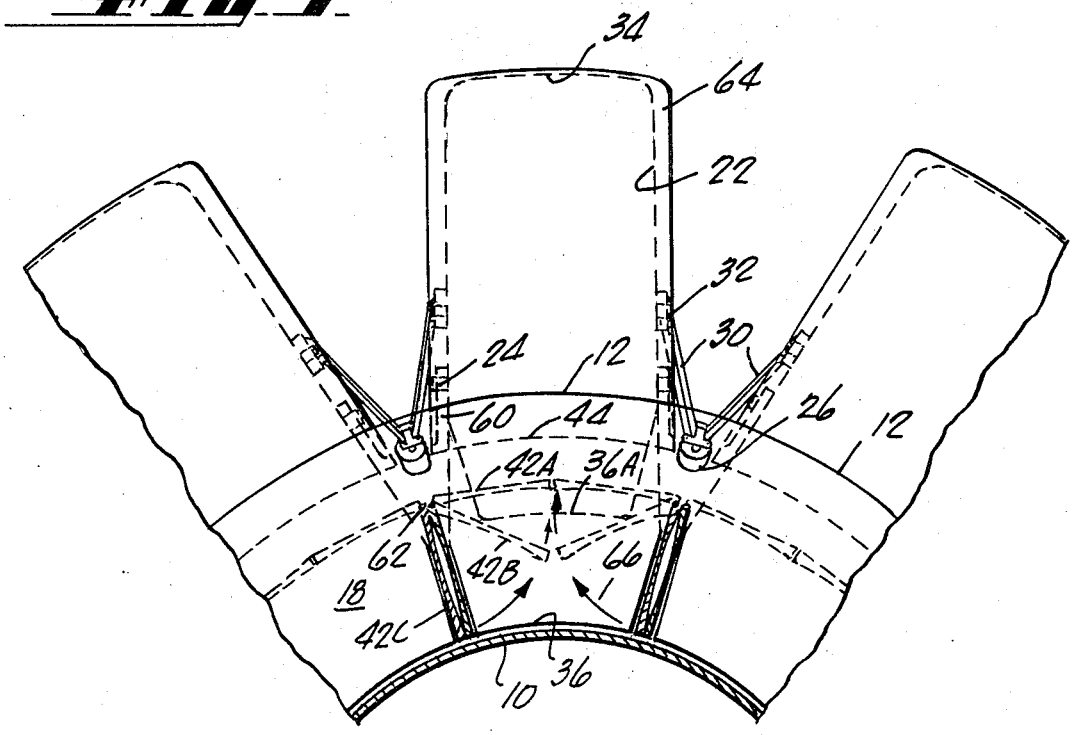
FIG. 6 is an enlarged fragmentary view taken along the line 6—6 in FIG. 5.

FIG. 6 is a fragmentary view taken along line 6—6 in FIG. 5. As can be seen, a pair of brackets 60 are mounted to inner surface 44 of air duct 18 adjacent to the side walls of duct members 22. These members are pivotally mounted to the brackets at 24. The inner end 36 of duct member 22 extends into air duct 18 after moving doors 42 from their closed position at dashed lines 42A, through their intermediate position 42B to their inwardmost position shown in section as 42C. When duct member 22 is in stowed position, the doors 42 return to their circumferential position about the periphery of air duct 18 by pivoting in the direction of arrows 66.

Actuators 26 are mounted within cowl 12 between reverser ducts 22 and have a pair of rods 30, one connected to each duct at pivot points 32 for movement of ducts 22 between their two positions.

As can be seen in the plan view in FIG. 7, each rod 30 is connected to the outer end of piston 68 of actuator 26 and to adjacent ducts 22 at pivot points 32. Actuator 26 may be mounted to cowling structure, not shown, by a fastener through aperture 28. Ducts 22 are pivotally connected at 24 to brackets 60 so that as piston 68 extends and retracts, ducts 22 pivot about points 24 and thus move between stowed and operating positions. While actuator 26 and piston 68 are part of a hydraulic system, the movement of rods 30 may also be done electrically or mechanically.

Having described an illustrative embodiment of the present invention, it is to be understood that other embodiments will occur to those skilled in the art and that these modifications are to be construed as part of the present invention.

I claim:

1. A turbofan engine thrust reverser for use with a high bypass turbofan engine with a cowling therearound to define a bypass air duct therebetween, said bypass air duct having an inlet and an exit, said thrust reverser comprising a plurality of tubular air reverser ducts pivotally mounted radially within said cowling, said air reverser ducts having inner ends and outlets, the inner ends of said air reverser ducts when pivoted to operative position blocking said exit of said bypass air duct to turn air from said bypass air duct into said air reverser ducts, the outlets of said air reverser ducts discharging air forwardly and outwardly from said cowling at circumferentially spaced points therefrom.

2. The combination as set forth in claim 1 wherein the outlets of said air reverser ducts have a combined cross-sectional area less than that of said bypass air duct.

3. The combination as set forth in claim 1 wherein doors are pivotally mounted on the inner surface of said cowling to provide said bypass air duct with a continuous surface for air passage through said bypass air duct when said reverser ducts are in stowed position.

4. The combination as set forth in claim 3 wherein said inner ends of said air reverser ducts pivot said doors inwardly upon pivoting of said air reverser ducts to said operative position.

5. The combination as set forth in claim 1 wherein the outlets of said air reverser ducts in operative position are spaced to provide ventilation spaces therebetween, whereby air through said ventilation spaces reduces the tendency of air from said air reverser ducts to be reingested in said engine.

6. The combination as set forth in claim 1 wherein said outlets of said air reverser ducts are of a size to provide high velocity of the reversed airflow.

7. The combination as set forth in claim 6 wherein the outlet velocity is approximately 50 percent greater than the velocity of air in the bypass duct.

* * * * *